United States Patent Office 2,980,626
Patented Apr. 18, 1961

2,980,626
PREPARATION OF A ZINC CHALCOGENIDE PHOSPHOR OF IMPROVED THERMAL STABILITY

Jacob Quentin Umberger, Holmdel, N.J., and Robert Ellis Wayrynen, Wilmington, Del., assignors to E. I. du Pont de Nemours and Company, Wilmington, Del., a corporation of Delaware No Drawing. Filed Sept. 26, 1957, Ser. No. 686,279
12 Claims. (Cl. 252—301.6)

This invention relates to improved luminescent materials and to their preparation. More patricularly it relates to phosphors of the zinc cadmium sulfide, zinc cadmium selenide and zinc cadmium sulfo-selenide class which have improved thermal-stability and to their preparation.

Zinc cadmium sulfide, zinc cadmium selenide and zinc cadmium sulfo-selenide phosphors are made by firing together mixtures of zinc and cadmium sulfides or zinc and cadmium sulfides and/or selenides to form solid solutions. These solid solutions have a tendency to darken in body color upon subsequent heating. Hence, when such phosphors have been applied to screens, e.g., cathode-ray tube screens, and have then been heated to remove gases from the tube and to cause the phosphor to adhere to the screen, the screens have exhibited a darkened body color on the phosphor. The darkened body color is probably the result of the production of yellow-orange cadmium sulfide or brown cadmium selenide formed by thermal decomposition of the solid solution. The dark color detracts from the utility of such sulfides and selenides in luminescent devices, for example, cathode-ray tube screens, luminescent panels, and tapes of all sorts, because it spoils the appearance, decreases the uniformity, and decreases the emission brightness of the phosphors. In the past no satisfactory means for preventing this darkening of body color has been found. Solutions of potassium or sodium cyanide frequently used in the art to remove dark phosphor coatings due to activators, such as Ag and Cu, have been of little use in preventing body color darkening. While they remove body color darkeners, e.g., $Ag_2S$ and $CuS$, the aqueous alkali metal cyanide treatment does not prevent the thermal decomposition which causes darkening.

An object of this invention is to provide luminescent materials of improved thermal stability. A more specific object is to provide zinc cadmium sulfide, zinc cadmium selenide and zinc cadmium sulfo-selenide phosphors of improved thermal stability. Another object is to provide a simple and economical process for improving the thermal stability of such phosphors. A related and further object is to provide a practical and reliable process for preventing the darkening of body color of the above class of phosphors. Still further objects will be apparent to those skilled in the art from the following description of the invention.

It has now been discovered that the above objects can be accomplished and phosphors of improved thermal stability provided in accordance with this invention which comprises treating a zinc cadmium sulfide, zinc cadmium selenide or zinc cadmium sulfo-selenide phosphor and particularly such phosphors activated with a heavy metal, e.g., silver, copper, gold, manganese or lead, with an aqueous solution containing zinc ions and sulfate ions, so that the surface of the phosphor particles are effectively wetted with the solution, and removing the treated phosphor particles from the aqueous solution. A period of at least 10 minutes is generally used and 15 to 30 minutes is generally adequate. Thus the phosphor particles can be filtered from the aqueous treating solution which is used in sufficient volume to insure adequate wetting, and the particles washed with water to remove the treating solution. Reduced pressure can be used during the filtering operation. The moist particles can then be dried and screened or sieved and are then ready for use, e.g., in cathode ray tube manufacture where they are subjected to an elevated temperature.

In an exemplary procedure, the zinc cadmium sulfide, zinc cadmium selenide or zinc cadmium sulfo-selenide phosphor, as prepared by the firing of a mixture of zinc and cadmium sulfide and/or selenide with flux and added activator, if desired, in the form of discrete particles free from large agglomerates is slurried with water and allowed to stand for a short time. The water is then decanted. A solution of zinc sulfate is added to the phosphor particles. For example, 50 grams of phosphor is treated with 50 ml. of 0.1 M $ZnSO_4$ solution by stirring the phosphor in the zinc sulfate solution to effect thorough or complete wetting of the surface of the phosphor particles, and the phosphor is filtered. The phosphor is then washed with water while on the filter with vacuum applied to the filter. The material is dried and sieved and is ready for use.

Zinc cadmium sulfide and zinc cadmium sulfo-selenide phosphors containing up to 80 gram atom percent cadmium including the heavy metal-activated phosphors are materially improved by the stated treatment with aqueous salt solutions containing zinc ions and sulfate ions of this invention. Also, phosphors of the zinc cadmium sulfide type which have been treated on the surface after calcination with various materials, for example alkaline earth halides, and then dried or baked may also be treated with a solution containing zinc ions and sulfate ions. For example, when zinc cadmium sulfide phosphors are heated with magnesium chloride or a mixture of magnesium and ammonium chlorides to form a coating or sheath around the phosphor particles, which treatment increases the tendency of the phosphor to darken in its body color during bake-out of cathode-ray tubes, slurrying of the phosphor with zinc sulfate-containing solutions is particularly efficacious.

Zinc sulfate of reagent grade is of adequate purity for the preparation of the treating solutions used in accordance with the present invention. Also, solutions containing other soluble zinc salts, such as zinc nitrate, together with other sulfates, such as sodium sulfate, may be used. It is necessary that both $Zn^{++}$ and $SO_4^{--}$ be present in the treating solution; however, other cations or anions from soluble salts may be present without deleterious effect but they are ineffective in increasing the thermal stability of the phosphors in question. Zinc sulfate treating solutions from 0.01 to 4 molar are useful and 0.03 M to 1.0 M are preferred concentrations. In general, the amount of solution used is at least half the weight of the phosphor. In general the treating solution will be maintained at room temperature although temperatures from 0° C. to 95° C. are practical.

This invention will be further illustrated by but is not intended to be limited to the following examples:

EXAMPLE I

A yellow-emitting silver-activated zinc cadmium sulfide phosphor was prepared by calcining at 840° C. a mixture of 61.6 mole percent ZnS and 38.4 mole percent CdS with silver nitrate to give 23 parts per million Ag by weight. This material was subsequently reheated with magnesium chloride to a temperature of 210° C. for 18 hours. Portions of the phosphor thus prepared were rinsed with water, washed with aqueous KCN, in the customary manner, and treated with a 0.1 M solution of zinc sulfate. The body color of the phosphor thus treated was measured in terms of percent reflectance at 450 millimicrons, both without further treatment and after being heated at 425° C. for 1½ hours and at 500° C. for 1¼ hours. The results obtained are summarized in Table 1.

Table 1

| Treating Solution | Percent Reflectance at 450 mμ | | |
|---|---|---|---|
| | Without Further Heating | Heated to 425° C. for 1½ hrs. | Heated to 500° C. for 1¼ hrs. |
| Water | 47.1 | 23.3 | 11.7 |
| KCN | 49.4 | 29.4 | 13.5 |
| ZnSO₄ | 51.7 | 51.3 | 22.6 |

These data show that the reflectance after zinc sulfate treatment was better than that after washing with water alone or with a solution of KCN. More important, however, the reflectance was changed only insignificantly after heating at 425° C. for 1½ hours in contrast to the samples washed with water and with KCN solution, in which the reflectance has been greatly decreased. Furthermore, when the samples were heated at 500° C. for 1¼ hours, the reflectance was not nearly so greatly diminished in the phosphor treated with zinc sulfate as with those washed with water and with KCN solution.

EXAMPLE II

A phosphor of the type described in Example I was treated with the solutions listed in Table 2. The percent reflectance of the treated phosphor was measured at 450 millimicrons after the phosphor had been heated for 1 hour at 470° C.

Table 2

| Treatment Solution | Reflectance |
|---|---|
| 1 M ZnSO₄ | 49.4 |
| 1 M ZnCl₂ | 20.3 |
| 1 M Zn(NO₃)₂ | 21.5 |
| 1 M Na₂SO₄ | 16.8 |
| 1 M MgSO₄ | 17.3 |
| 0.5 M Al₂(SO₄)₃ | 25.5 |

Table 2 shows clearly that zinc sulfate only, and not other zinc salts nor other sulfates, is effective in furnishing thermal stability to the zinc cadmium sulfide phosphors.

EXAMPLE IIa

Ten-gram samples of a zinc cadmium sulfide phosphor like that of Example I were each washed with 20 ml. water, and, after 10 minutes, the water was decanted. Each sample was treated with 5 ml. of each of the two solutions as shown in Table 2a. Solution No. 1 was added to the sample and then solution No. 2, with stirring. The stirring was continued for 5 minutes. The phosphor was filtered, washed twice on the filter with 10 ml. water, dried, and sieved. Two-gram portions of the phosphor were baked in beakers for 1½ hours at 425° C. The reflectance at 450 millimicrons is shown in Table 2a.

Table 2a

| Sample | Solution No. 1 | Solution No. 2 | Percent Reflectance | |
|---|---|---|---|---|
| | | | No Bake | Baked at 425° C. |
| 1 | 0.2 M ZnSO₄ | H₂O | 49.5 | 50.2 |
| 2 | 0.2 M Na₂SO₄ | 0.2 M ZnCl₂ | 50.7 | 51.0 |
| 3 | 0.2 M Na₂SO₄ | 0.2 M Zn(NO₃)₂ | 49.5 | 53.2 |
| 4 | 0.2 M (NH₄)₂SO₄ | 0.2 M Zn(NO₃)₂ | 49.0 | 49.8 |
| 5 | 0.2 M (NH₄)₂SO₄ | 0.2 M ZnSO₄ | 50.2 | 51.4 |
| 6 | 0.2 M Na₂S₂O₃ | 0.2 M Zn(NO₃)₂ | 51.1 | 29.1 |
| 7 | 0.2 M NaHSO₃ | 0.2 M Zn(NO₃)₂ | 47.8 | 21.0 |
| 8 | 0.2 M H₂SeO₃ | 0.2 M Zn(NO₃)₂ | 46.5 | 11.4 |
| 9 | 0.2 M H₂SeO₃ | 0.2 M ZnCl₂ | 48.9 | 13.2 |
| 10 | (No treatment, neither MgCl₂ nor ZnSO₄) | | 50.0 | 32.2 |

It is thus further seen that only with those solutions containing both $Zn^{++}$ and $SO_4^{--}$ is the improved stability of the zinc cadmium sulfide phosphor on reheating obtained.

EXAMPLE III

Phosphors prepared by calcination of ZnS and CdS in varying ratios with Ag activator were treated with 1 M ZnSO₄ solution. These phosphors showed the percent reflectance at 450 millimicrons given in Table 3.

Table 3

| Composition, mole percent | | Treatment | Percent Reflectance | |
|---|---|---|---|---|
| ZnS | CdS | | Unheated | Baked at 425° C. for 2 hrs. |
| 61.6 | 38.4 | None | 50.0 | 31.4 |
| 61.6 | 38.4 | ZnSO₄ | 53.1 | 40.0 |
| 59.8 | 40.2 | None | 36.9 | 28.5 |
| 59.8 | 40.2 | ZnSO₄ | 39.0 | 39.0 |
| 57.3 | 42.7 | None | 34.1 | 22.6 |
| 57.3 | 42.7 | ZnSO₄ | 35.0 | 35.9 |

It is seen that in each case treatment of the phosphor with zinc sulfate solution improved the reflectance of the unheated material somewhat and that the reflectance of the zinc sulfate treated material baked at 425° C. for 2 hours was significantly better than that of the corresponding untreated phosphor.

EXAMPLE IV

That the improvement in thermal stability due to the ZnSO₄ treatment is even greater if the calcined phosphor is heated with MgCl₂ at about 200° C. before treating with ZnSO₄ is evident from Table 4, in which the phosphor composition is 61.6 mole percent ZnS, 38.4 mole percent CdS activated by 23 p.p.m. Ag. In these experiments 30 g. of phosphor were washed with water, slurried with 30 ml. of ZnSO₄ solution for 15 minutes, filtered, washed with water in two 30 ml. portions on the filter with vacuum and dried.

Table 4

| Treatment | Percent Reflectance at 450 millimicrons | |
|---|---|---|
| | Unbaked | Baked at 425° C. for 2 hours |
| None | 50.0 | 31.4 |
| ZnSO₄ (1 M) | 53.1 | 40.0 |
| MgCl₂ | 50.9 | 21.7 |
| MgCl₂ plus ZnSO₄ (1 M) | 52.0 | 52.0 |

EXAMPLE V

Silver and copper-activated phosphors were prepared by firing mixtures of ZnS and CdS in the proportions shown in Table 5 with 3% NaCl flux at 850° C. for 45 minutes in a crucible surrounded by ZnS in a larger crucible. The copper was added as a CuCl₂ solution and the silver was added as AgNO₃ solution. After firing, the phosphors were washed with water to free them of flux. Five-gram portions of the phosphors were then treated with MgCl₂ by adding 7.5 ml. of solution containing 1.75 g. MgCl₂/100 ml. and heating at a temperature of 205° C. for 18 hours. The MgCl₂-treated phosphors were then slurried with 10 ml. water, allowed to stand five minutes, and the supernatant liquid was decanted. Five ml. of 0.1 M ZnSO₄ solution was added, and the slurry was stirred for 15 minutes and filtered. The phosphors were washed on the filter by adding 5 ml. water twice with vacuum applied to the filter. The samples were then dried and sieved. The treated samples and corresponding sample of the untreated phosphors were baked at 500° C. for ½ hour. The comparative reflectances at 450 millimicrons are shown in Table 5.

Table 5

| Composition, mole percent | | Activator (p.p.m. by weight) | Percent Reflectance | | | Emission color |
|---|---|---|---|---|---|---|
| | | | Un-baked | Baked at 500° C. for ½ hr. | | |
| ZnS | CdS | | | Un-treated | Treated | |
| 80 | 20 | 30 Cu | 51.5 | 38.2 | 50.7 | Pale orange. |
| 60 | 40 | 30 Cu | 33.5 | 17.4 | 31.5 | Dark orange. |
| 80 | 20 | 50 Ag | 77.1 | 48.0 | 75.1 | Pale green. |
| 20 | 80 | 50 Ag | 6.6 | 6.3 | 6.5 | Red. |
| 20 | 80 | 50 Ag | ¹18.2 | ¹16.8 | ¹17.1 | Red. |

¹ Reflectance at 520 millimicrons.

EXAMPLE VI

A phosphor of the type described in Example I was treated with $ZnSO_4$ solutions of varying concentration, and the reflectance was measured at 450 millimicrons before and after baking, with the results shown in Table 6. The effect of the concentration of $ZnSO_4$ on the thermal stability of zinc cadmium sulfide phospors is shown in the following table:

Table 6

| Sample | Solution | No bake | Percent Reflectance at 450 millimicrons— Baked | |
|---|---|---|---|---|
| | | | 425° C., 1½ hr. | 500° C., 1¼ hr. |
| 1 | Water | 47.1 | 23.3 | 11.7 |
| 2 | 0.001 M $ZnSO_4$ | 44.7 | 24.2 | 11.0 |
| 3 | 0.03 M $ZnSO_4$ | 46.1 | 38.7 | 12.9 |
| 4 | 0.05 M $ZnSO_4$ | 49.5 | 53.9 | 19.5 |
| 5 | 0.1 M $ZnSO_4$ | 50.6 | 51.5 | 28.5 |
| 6 | 1 M $ZnSO_4$ | 52.7 | 55.2 | 26.4 |

EXAMPLE VII

Three silver-activated zinc cadmium sulfo-selenide phosphors were prepared by firing mixtures of ZnS, CdS, and ZnSe with 3% NaCl flux by weight for 45 minutes at 850° C. to give the compositions shown in Table 7 in gram atom percent. Portions of each were treated with 1 ml. 0.1 M $ZnSO_4$ solution per gram of phosphor. Portions of the treated and untreated phosphors were baked at the temperatures and times shown in the table. The reflectance measurements at 600 millimicrons are given in the Table 7.

Table 7

| Bake | | Percent Reflectance | | | | | |
|---|---|---|---|---|---|---|---|
| 10° C. | Hr. | Zn-Cd-S-Se (90:10:10:90) | | Zn-Cd-S-Se (70:30:50:50) | | Zn-Cd-S-Se (50:50:90:10) | |
| | | Un-treated | $ZnSO_4$ Treated | Un-treated | $ZnSO_4$ Treated | Un-treated | $ZnSO_4$ Treated |
| None | | 53.0 | 50.0 | 74.5 | 74.2 | 92.3 | 92.1 |
| 300 | 1 | 47.0 | 48.0 | 72.5 | 72.8 | 94.2 | 92.4 |
| 350 | 0.5 | 36.1 | 46.0 | 55.3 | 73.2 | 93.9 | 92.4 |
| 425 | 0.5 | | | | | 81.2 | 87.3 |

The results in Table 7 illustrate the well-known fact that selenide phosphors are less thermally stable than sulfide phosphors, and increasing the proportion of selenide in a sulfoselenide phosphor lowers the thermal stability. However, in each case the thermal stability, as judged by the ability to resist darkening in body color upon heating, is improved by the $ZnSO_4$ treatment.

Examples II and IIa show that the combination of zinc ions and sulfate ions only is applicable to the process of the present invention. Treatment of the above phosphors with aqueous solutions of salts of other metals and other sulfates have not been found to improve the thermal stability of the phosphors.

As has been stated above, zinc cadmium sulfide phosphors containing amounts up to 80 mole percent cadmium sulfide may be treated by the present method. From Table 5 it is seen that the treatment with $ZnSO_4$ solution shows a slight effect at an 80 mole percent content of CdS. The treatment is useful in ZnCdS solid solutions up to a point where the CdS content is so high that the body color of the activated phosphor approaches the body color of CdS. On the other hand, the zinc sulfate treatment is effective down to very small amounts of CdS in the phosphor. Of course, as the CdS content is reduced to extremely low levels, the likelihood of the formation of CdS to darken the body color is also reduced.

Although the pH is rather unimportant, it is not practical to raise the pH during treatment much above 5 because $Zn(OH)_2$ will precipitate in more alkaline solution and thus change the concentration of the solution. Suitable chemicals for adjusting the pH include acids such as HCl, $H_2SO_4$, $HNO_3$, $HC_2H_3O_2$, etc., and bases such as alkali metal hydroxides and $NH_4OH$.

Luminescent phosphors obtained from the process of this invention have greater utility than the untreated phosphors in the manufacture of cathode-ray tube screens or wherever appearance, uniformity, reflectance, and emission brightness of a phosphor are of great importance. Both black-and-white and color television screens made from the improved phosphors have enhanced properties. Other uses for the improved phosphors treated according to the invention include fluoroscopic screens, X-ray intensifying screens, miniature radiographic screens, screens for electron microcopy and oscilloscopes, etc. The phosphors prepared according to this invention are especially useful where subsequent treatment at high temperatures is required, as in causing the phosphors to adhere to the desired substrate.

Besides the advantage of thermal stability of the phosphors obtained in accordance with the invention upon subsequent heating, there is also the advantage of improved brightness of the phosphor. A further advantage of the invention is that the treatment with zinc sulfate-containing solutions is inexpensive and relatively non-toxic, with no complicated ventilation or disposal problems.

Another advantage of the invention is that phosphors obtained may be applied to cathode-ray tube screens and baked in the conventional manner without leaving any organic residue. Furthermore, screens prepared in this manner are more resistant to the degradation caused by the concentrated, localized heating action of the electron beam in cathode-ray tubes.

What is claimed is:

1. The process for the preparation of a zinc chalcogenide phosphor of improved thermal stability which comprises treating particles of a fired phosphor taken from the class consisting of zinc cadmium sulfide, zinc cadmium selenide and zinc cadmium sulfo-selenide phosphors with an aqueous solution containing zinc ions and sulfate ions in an amount sufficient to form 0.03 to 4 molar zinc sulfate until the surface of said particles is effectively wetted and removing the treated particles from the aqueous solution.

2. A process as set forth in claim 1 wherein the aqueous solution is agitated during the treatment.

3. A process as set forth in claim 1 wherein the treating solution is maintained at a temperature between 0° C. and 95° C. and has a weight at least one half the weight of the phosphor.

4. A process as set forth in claim 1 wherein the phosphor contains up to 80 gram atom percent cadmium.

5. A process as set forth in claim 1 wherein said phosphor is silver-activated.

6. A process as set forth in claim 1 wherein said phosphor is copper activated.

7. The process for the preparation of a zinc chalcogenide phosphor of improved thermal stability which comprises treating particles of a fired phosphor activated by a metal selected from the group consisting of silver, copper, gold, manganese and lead and taken from the class consisting of zinc cadmium sulfide, zinc cadmium selenide and zinc cadmium sulfo-selenide phosphors with an aqueous solution containing zinc ions and sulfate ions in an amount sufficient to form 0.03 to 4 molar zinc sulfate until the surface of said particles is effectively wetted, filtering the treated particles and washing the latter with water.

8. A process as set forth in claim 7 wherein said solution is agitated during the treatment.

9. A process as set forth in claim 7 wherein said solution is agitated during the treatment and maintained at a temperature between 0° C. and 95° C.

10. A process as set forth in claim 7 wherein the phosphor contains up to 80 gram atom percent cadmium.

11. A process as set forth in claim 7 wherein said phosphor is silver activated.

12. A process as set forth in claim 7 wherein said phosphor is copper-activated.

References Cited in the file of this patent

UNITED STATES PATENTS

| | | |
|---|---|---|
| 2,252,590 | Wolfson | Aug. 12, 1941 |
| 2,396,219 | Weagle | Mar. 5, 1946 |
| 2,728,730 | Butler | Dec. 27, 1955 |
| 2,821,509 | Hunt | Jan. 28, 1958 |
| 2,847,386 | Mazo | Aug. 12, 1958 |